Aug. 14, 1923.
E. E. KERNS
1,464,767
AUTOMATIC SHUT-OFF VALVE
Filed Aug. 18, 1921
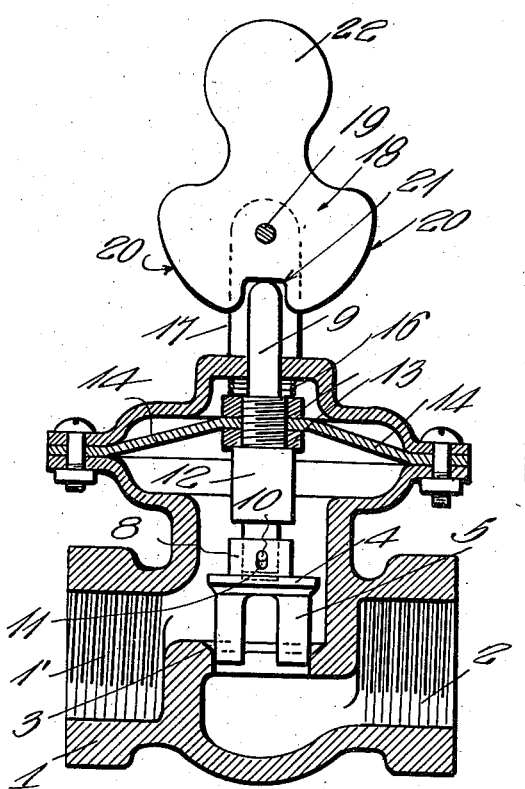
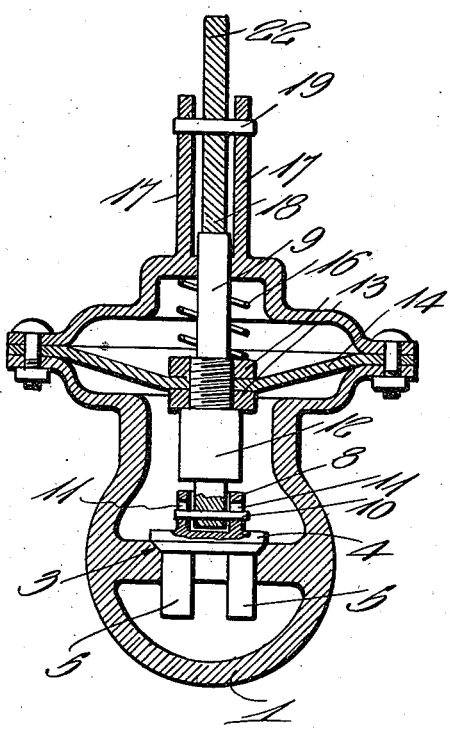
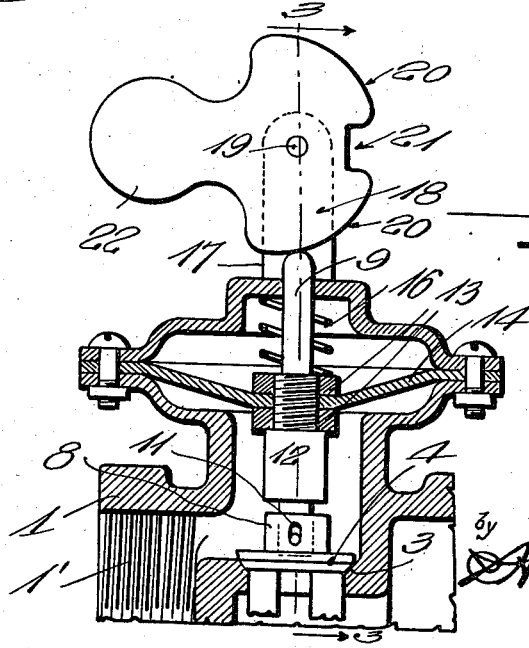
Inventor
E. E. Kerns
by H. B. Willson & Co.
Attorneys Patented Aug. 14, 1923.

1,464,767

UNITED STATES PATENT OFFICE.

ELMER E. KERNS, OF BRADFORD, PENNSYLVANIA.

AUTOMATIC SHUT-OFF VALVE.

Application filed August 18, 1921. Serial No. 493,333.

*To all whom it may concern:*

Be it known that I, ELMER E. KERNS, a citizen of the United States, residing at Bradford, in the county of McKean and State of Pennsylvania, have invented certain new and useful Improvements in Automatic Shut-Off Valves; and I do declare the following to be a full, clear, and exact description of the invention, such as will enable others skilled in the art to which it appertains to make and use the same.

My invention relates to improvements in automatic gas shut-off valves and more particularly to those which are used in the gas supply lines of dwellings and other buildings. Devices of this character have heretofore been used to close automatically when the gas pressure dies down to such an extent as to extinguish any of the burners within the building, preventing the gas from flooding the latter when the pressure is again restored. My invention, however, aims to improve upon devices of the type set forth, one object being to provide a novel cam which is normally held in inoperative position by the valve stem, but is active automatically on said stem to hold the latter in valve-closing position, as soon as the gas pressure dies down below a pre-determined degree.

Another object of the invention is to provide a sliding connection between the valve and the valve stem, the arrangement being such that upon the closing movement of the valve, the stem acts as a hammer to tightly seat said valve. A diaphragm is used to hold the valve stem raised and the valve open as long as the gas pressure is normal, said diaphragm also serving to open the valve when the cam is released, if the gas pressure is sufficient; and the aforesaid sliding connection acts also to provide for jarring the valve from its seat to relieve the diaphragm of excess strain.

With the foregoing in view, the invention resides in the novel subject matter hereinafter described and claimed, the descriptive matter being supplemented by the accompanying drawing.

Figure 1 is a vertical longitudinal sectional view of a valve constructed in accordance with my invention, showing the same in open position.

Figure 2 is a view similar to Fig. 1, but showing the valve in closed position.

Figure 3 is a vertical transverse sectional view as indicated by line 3—3 of Fig. 2.

In the drawings above briefly described, the numeral 1 designates an appropriate valve casing having an inlet 1', an outlet 2, and a valve seat 3 between them. Cooperable with this seat, is a valve 4 of any suitable type, which, as here shown is provided with guiding fingers 5 which depend into the opening surrounded by the seat 3. The upper side of the valve 4 is formed with a socket 8 in which the lower end of a vertical valve stem 9 is loosely received, said stem and socket being slidably connected with each other by means of a pin 10 and slots 11. The portion of the stem 9 directly above the socket 8 is by preference increased in size as at 12 to provide a weight which assists in closing the valve 4. Above this weight, the valve stem has a gas tight connection 13 with a diaphragm 14, this diaphragm being clamped across the upper portion of the casing 1 as shown. From the diaphragm, the stem 9 extends loosely through an opening in the top of the casing to be acted on by an improved type of cam.

As long as the gas pressure is sufficient to act on the diaphragm 14 and hold the stem 9 and valve 4 in the raised position shown in Fig. 1, the gas can pass freely through the valve casing 1. As soon as the pressure dies down to a dangerous degree, however, the valve stem and the valve drop under the influence of their own weight and the action of a coiled spring 16, and during this movement, the stem acts as a hammer against the valve 4 to more tightly seat the latter after it has contacted with the seat 3. Similarly, when the gas pressure again rises to normal, and the locking cam has been manually released, the pressure acting against the diaphragm 14, moves the stem 9 rapidly upward until its pin 10 strikes the upper ends of the slots 11. When this occurs, the valve 4 is jarred from its seat so that it will open easily.

Rising from the casing 1 on opposite sides of the stem 9, I have shown a pair of arms 17 between which the locking cam 18 is pivoted on a pin 19. The cam 18 is formed with curved, downwardly converging cam surfaces 20, at opposite sides of its pivotal axis and the lower edge of said cam is formed with a central notch 21 between the surfaces 20, said notch normally receiving the upper end of the stem 9 so that the cam is held against rocking in either direction under the influence of its weighted upper end 22. The parts then stand as shown in Fig. 1 and normal gas pressure is passing through the valve. When for any reason this pressure is cut off or greatly diminished at the inlet or meter side of the valve, the diaphragm 14, valve stem 9, and the valve 4 drop. When this takes place, since the cam 18 is free of the stem 9, this cam is overbalanced in one direction or the other by the weight 22, with the result that the cam takes the position shown in Fig. 2. As above stated, the stem 9 exerts a hammer blow on the valve 4 when closing and it will be seen that a similar blow is exerted on the upper end of the stem 9 when it is struck by one of the cam surfaces 20. The valve is thus tightly wedged in place and held against accidental opening. In order that the valve may be again placed in condition for allowing passage of gas, it is necessary to right the cam 18, whereupon the diaphragm 14 will unseat the valve 4 and raise the stem 9 into the notch 21, if the gas pressure is sufficient. If not, however, the stem will not raise and the cam should be left in stem-locking position, until it is certain that the gas pressure is again at normal. In the foregoing, I have described certain specific details for carrying out one embodiment of my invention and while these details are illustrated in the accompanying drawing, it is to be understood that numerous minor changes may be made within the scope of the invention as claimed.

I claim:

1. An automatic shut off valve comprising a casing, a pressure-supported self-closing valve in said casing having a stem extending upwardly therethrough, and a cam pivotally mounted on said casing over said stem, said cam having downwardly converging cam surfaces on opposite sides of its pivot and being provided with a central downwardly opening notch between said cam surfaces adapted to normally receive the upper end of said stem, the upper end of said cam having a weight above its pivot adapted to fall by gravity at either side of the pivotal axis of said cam and move one or the other of the cam surfaces into wedging engagement with said stem when the latter descends.

2. A device of the class described comprising a valve casing, a downwardly closing self acting valve in said casing having a socket in its upper side, said socket having vertically elongated slots in opposite sides, a vertical valve stem having its lower end slidably received in said socket, a pin passing through said valve stem and having its ends slidably received in said slots, means controlled by pressure within the casing for holding said valve open, and a weight operated cam mounted on the casing to strike and shift said stem downwardly in said socket when the valve closes, whereby to hammer the valve tightly shut.

3. A device of the class described comprising a valve casing having an upwardly facing seat and a horizontal diaphragm above said seat, the upper end of the casing being provided with a central opening above said diaphragm, a downwardly closing valve cooperable with said seat, a vertical valve stem passing through said opening in the casing and through said diaphragm, means securing said stem to said diaphragm in a fluid tight manner, including a nut threaded upon the stem and contacting with the upper side of said diaphragm, a coiled spring surrounding the stem between the upper end of the casing and said nut to force downwardly upon the stem when pressure within the casing is relieved from the diaphragm, the stem being materially enlarged between the diaphragm and the valve to form a weight which also assists in closing said valve, a pair of parallel arms rising rigidly from the casing at opposite sides of the stem and extending above said stem, a pivot pin extending between said arms at a point spaced vertically above the stem, a cam pivotally mounted on said pivot pin and having downwardly converging cams at opposite sides of said pin, being provided with a downwardly opening notch at the lower ends of said cams normally receiving the upper end of the stem to hold the cam against pivotal action, and a weight integral with the upper end of said cam.

In testimony whereof I have hereunto set my hand.

ELMER E. KERNS.